United States Patent [19]

Jarman

[11] Patent Number: 5,139,066
[45] Date of Patent: Aug. 18, 1992

[54] TIRE CONSTRUCTION

[75] Inventor: Brian Jarman, Sorrento, Australia

[73] Assignee: Altrack Limited, West Perth, Australia

[21] Appl. No.: 477,933

[22] PCT Filed: Dec. 8, 1988

[86] PCT No.: PCT/AU88/00470
§ 371 Date: Jul. 23, 1990
§ 102(e) Date: Jul. 23, 1990

[87] PCT Pub. No.: WO89/05736
PCT Pub. Date: Jun. 29, 1989

[30] Foreign Application Priority Data

Dec. 15, 1987 [AU] Australia .............................. PI5903
Jan. 19, 1988 [AU] Australia .............................. PI6380

[51] Int. Cl.⁵ .............................................. B60C 7/10
[52] U.S. Cl. .............................. 152/7; 152/11; 152/324
[58] Field of Search ................... 152/1, 5, 6, 7, 11, 152/12, 17, 323, 324, 325, 326, 327, 328

[56] References Cited

U.S. PATENT DOCUMENTS

| | | | |
|---|---|---|---|
| 1,414,252 | 4/1922 | Brubaker | 152/324 |
| 1,552,081 | 9/1925 | Rett | 152/324 |
| 1,597,381 | 8/1926 | Lambert | 152/324 |
| 2,603,267 | 7/1952 | Simpson | 152/7 |
| 2,620,845 | 12/1952 | Lord | 152/328 |
| 3,311,149 | 3/1967 | Mathiesen | 152/7 |

FOREIGN PATENT DOCUMENTS

| | | | |
|---|---|---|---|
| 1755845 | 12/1971 | Fed. Rep. of Germany | 152/323 |
| 0163002 | 7/1986 | Japan | 152/7 |

Primary Examiner—Russell D. Stormer
Attorney, Agent, or Firm—Handal & Morofsky

[57] ABSTRACT

A non-pneumatic tire (10) comprising an annular body (15) of resilient construction having a radially outer peripheral portion (19) and a radially inner peripheral portion (17). A circumferential web extends between, and is connected to, the radially inner and outer portions. To each side of the circumferential web there is a set of circumferentially spaced ribs (45, 49). Each rib extends between and is connected to the radially inner and outer portions of the tire. Each rib is also connected to the web. A characterizing feature of the tire is that the circumferential web comprises consecutive web sections (53) extending in alternate directions.

4 Claims, 8 Drawing Sheets

TIRE CONSTRUCTION

FIELD OF THE INVENTION

This invention relates to a tire construction and in particular to a tire construction which is non-pneumatic.

BACKGROUND OF THE INVENTION

There are various proposals for construction of tires which are non-pneumatic so as to avoid the problem of puncturing and which provide acceptable cushioning and performance characteristics.

Where the proposals are concerned with solid tires constructed predominantly from elastomeric material, a difficulty arises in dissipating heat generated in the tires, and resultant accumulation of heat may lead to degradation of the tire material.

Other proposals overcome or avoid the problem of heat accumulation by providing cavities in the body of the tire. The cavities not only reduce the overall mass of the tire so as to reduce the extent of heat generated but also enhance heat dissipation. In certain proposals, the cavities are so arranged as to result in the formation of a load carrying and supporting structure within the tire between its inner and outer peripheries. Such a structure within the tire is arranged to have load bearing capabilities while also being capable of deformation to provide cushioning. Several such proposals are disclosed in European Patent Application Nos. 0159880 and 0245789 and each comprises a structure in the form of circumferentially spaced apart ribs interconnected by a central web which is generally planar and extends circumferentially around the rotational axis of the tire. With this structure, each section of the central web between neibouring ribs has a longitudinal extent aligned with the direction of rotation of the tire and consequently may be vulnerable to collapsing when the tire is subjected to lateral forces, particularly during cornering.

SUMMARY OF THE INVENTION

The present invention seeks to provide a novel and useful tire construction which improves the stability of the tire.

In one form the invention resides in a tire construction comprising an annular body of resilient construction having a radially outer peripheral portion, a radially inner peripheral portion, a circumferential web extending between and connected to the radially inner and outer portions, and two sets of circumferentially spaced apart ribs one set to each side of the circumferential web, each rib extending between and connected to the radially inner and outer portions and being connected to the web, characterised in that the circumferential web comprises consecutive web sections extending in alternate directions.

Preferably, said consecutive sections of the web define a zig-zag formation.

Preferably, the ribs of one set are circumferentially offset from the ribs of the other set.

Preferably, the ribs are connected to the web at the ends of said web sections. Where the consecutive web sections define a zig-zag formation as aforesaid, the ribs are connected to the web at the junctions between consecutive straight sections of the zig-zag formation.

Preferably each rib is configured so as to be somewhat angular in profile to define a zone at which the rib can resiliently flex. Preferably, each web section is also configured so as to be somewhat angular in profile to define a zone at which the web section can resiliently flex.

Conveniently, the arrangement of the web and circumferentially spaced ribs to each side of the web is produced by providing two sets of passageways in the tire one corresponding to each side of the tire, the passageways of each set opening onto their corresponding side of the tire and extending across the tire towards the other side to terminate inwardly of said other side, the two sets of passageways being circumferentially offset in relation to each other such that each passageway of one set extends into the region between neighbouring passageways of the other set.

In another form the invention resides in a tire construction comprising an annular body of resilient construction having a radially outer peripheral portion, a radially inner peripheral portion and an intermediate portion between the radially outer and inner portions, the intermediate portion being provided with two sets of circumferentially spaced apart passages one set corresponding to each side of the tire, the passageways of each set opening onto their corresponding side of the tire and extending across the tire towards the other side to terminate inwardly of said other side, said two sets of passageways being offset in relation to each other such that each passageway of one set extends into the region between neighbouring passageways of the other set.

Preferably, the inner portion of each passageway converges in the inward direction.

With such a construction, a rib is defined by the partition between neighbouring passageways of each set and a web section is defined by a further partition between each passageway in one set and a neighbouring passageway in the other set wherein consecutive web sections extend in alternate directions.

Preferably, said web sections co-operate to define a circumferentially extending web of zig-zag formation.

The tire may be of unitary construction or segmental construction.

The radially inner portion of the tire may encase reinforcing means. Preferably, the reinforcing means extends across the radially inner portion for a substantial part of the width thereof. The reinforcing means is preferably in the form of an annular band concentric with the tire. The annular band may be perforated to facilitate bonding of the tire material to the annular band.

BRIEF DESCRIPTION OF THE DRAWINGS

The invention will be better understood by reference to the following description of one specific embodiment thereof as shown in the accompanying drawings in which.

DESCRIPTION OF PREFERRED EMBODIMENT

Figure 7:
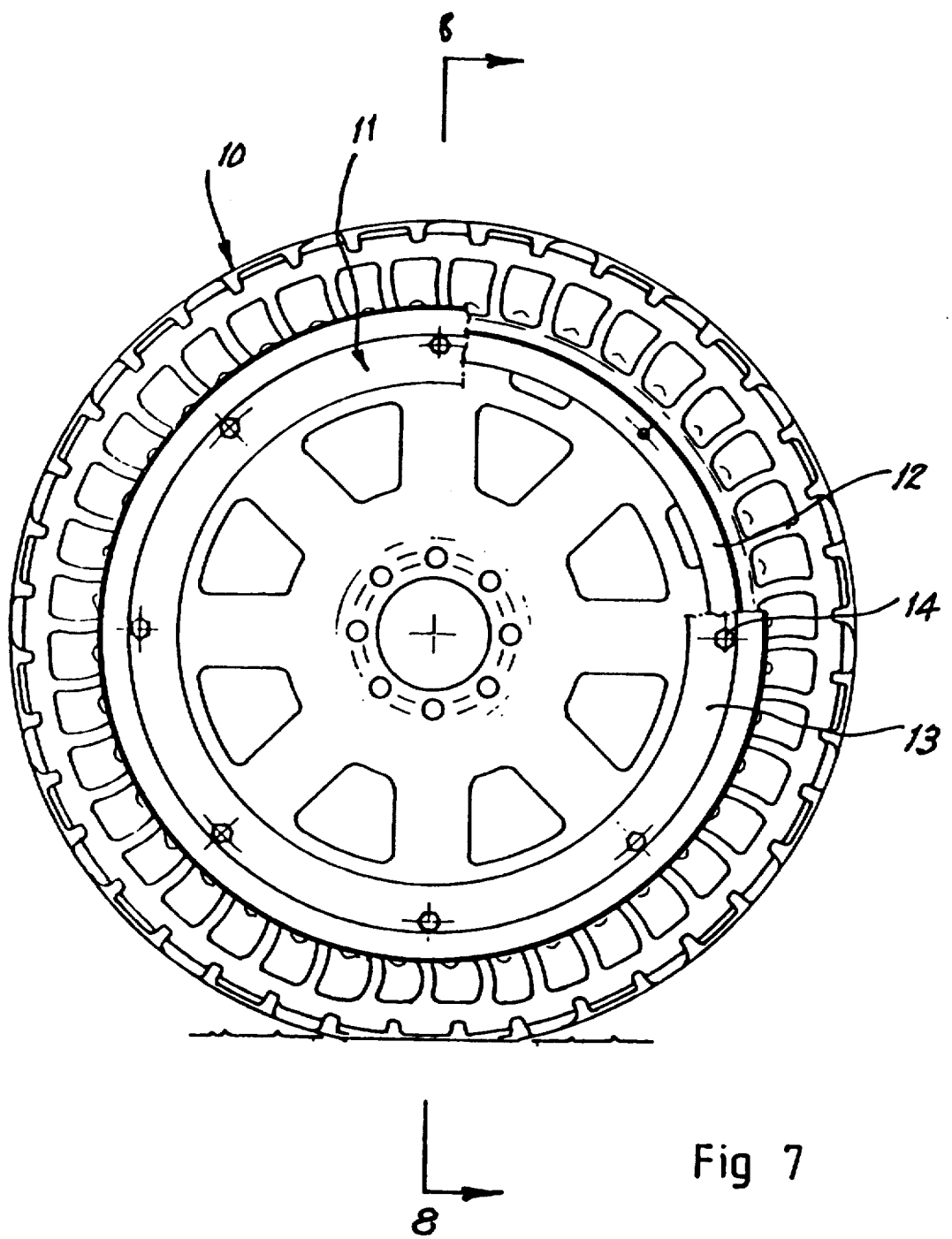
FIG. 7 is a schematic view showing the tire according to the embodiment fitted onto a support rim with a portion of an outer part of the support rim cut away to reveal an inner part of the rim.
Figure 8:
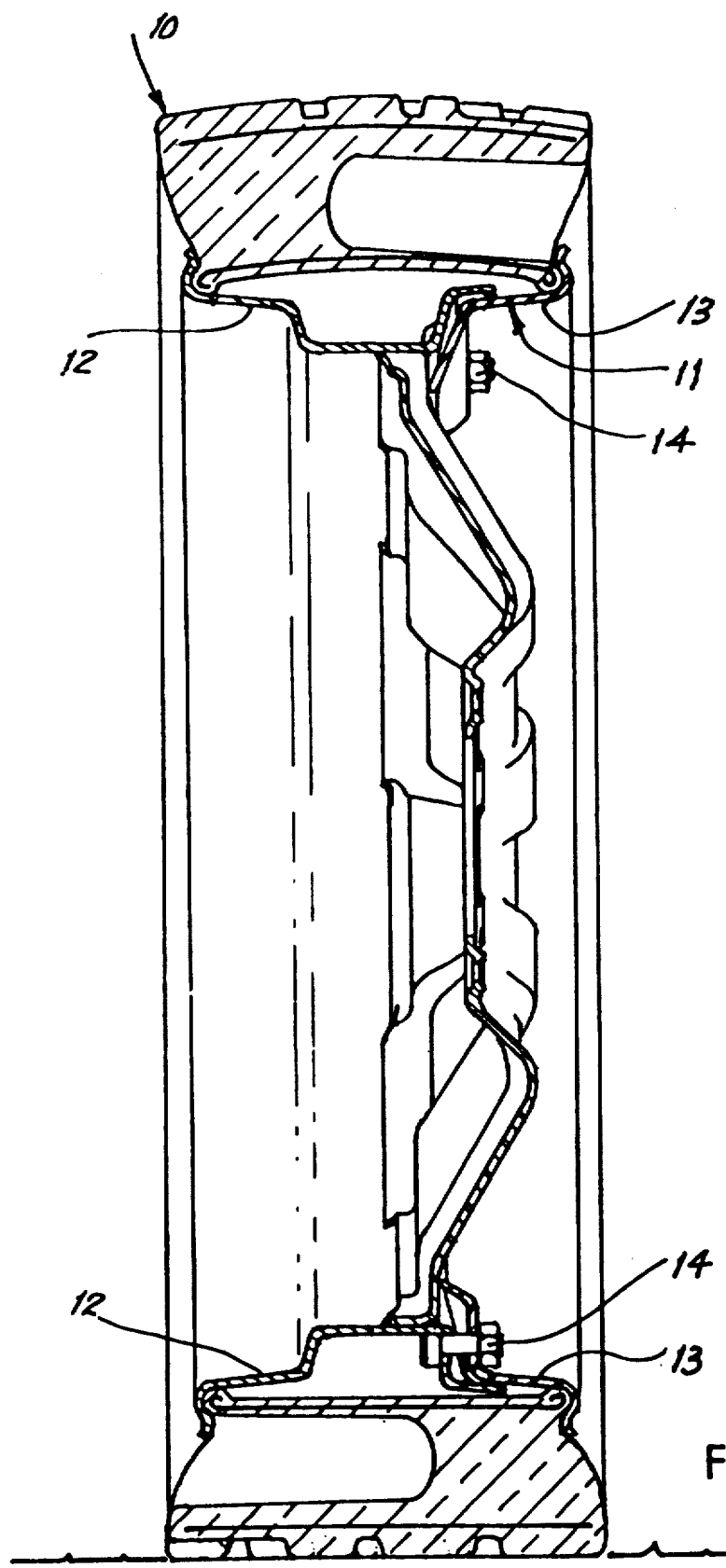
FIG. 8 is a section along the line 8—8 of FIG. 7.

The embodiment shown in the drawings is directed to a non-pneumatic tire 10 which is to be mounted onto a support rim 11. The support rim is shown in FIGS. 7 and 8 and is constructed in two parts being an inner part 12 and an outer part 13. The two parts 12 and 13 can be separated to facilitate mounting of the tire onto the rim and thereafter secured together by any suitable means, such as circumferentially spaced apart bolts 14, to maintain the tire on the rim.

Figure 1:
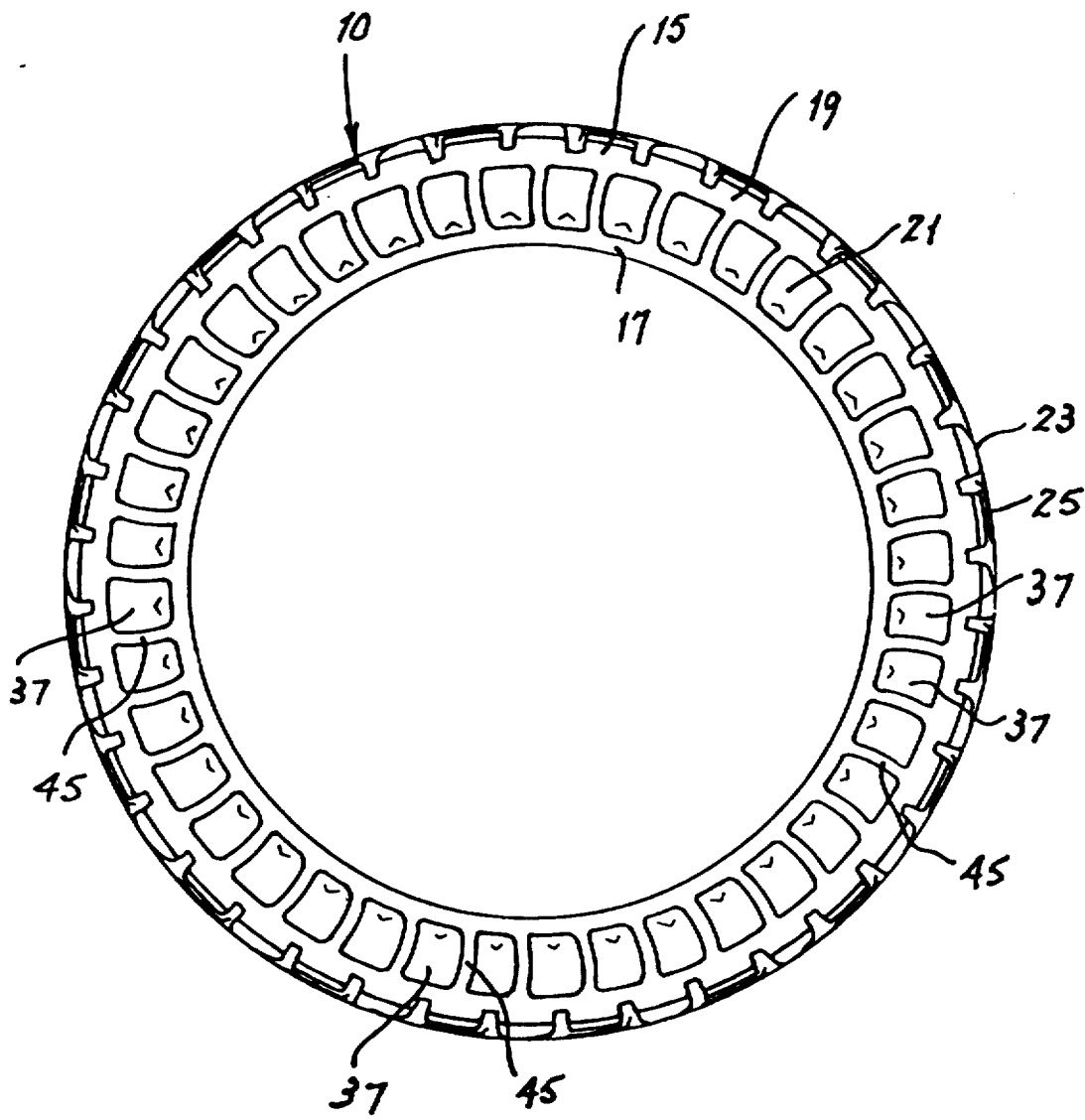
FIG. 1 is a side view of the tire according to the embodiment.
Figure 2:
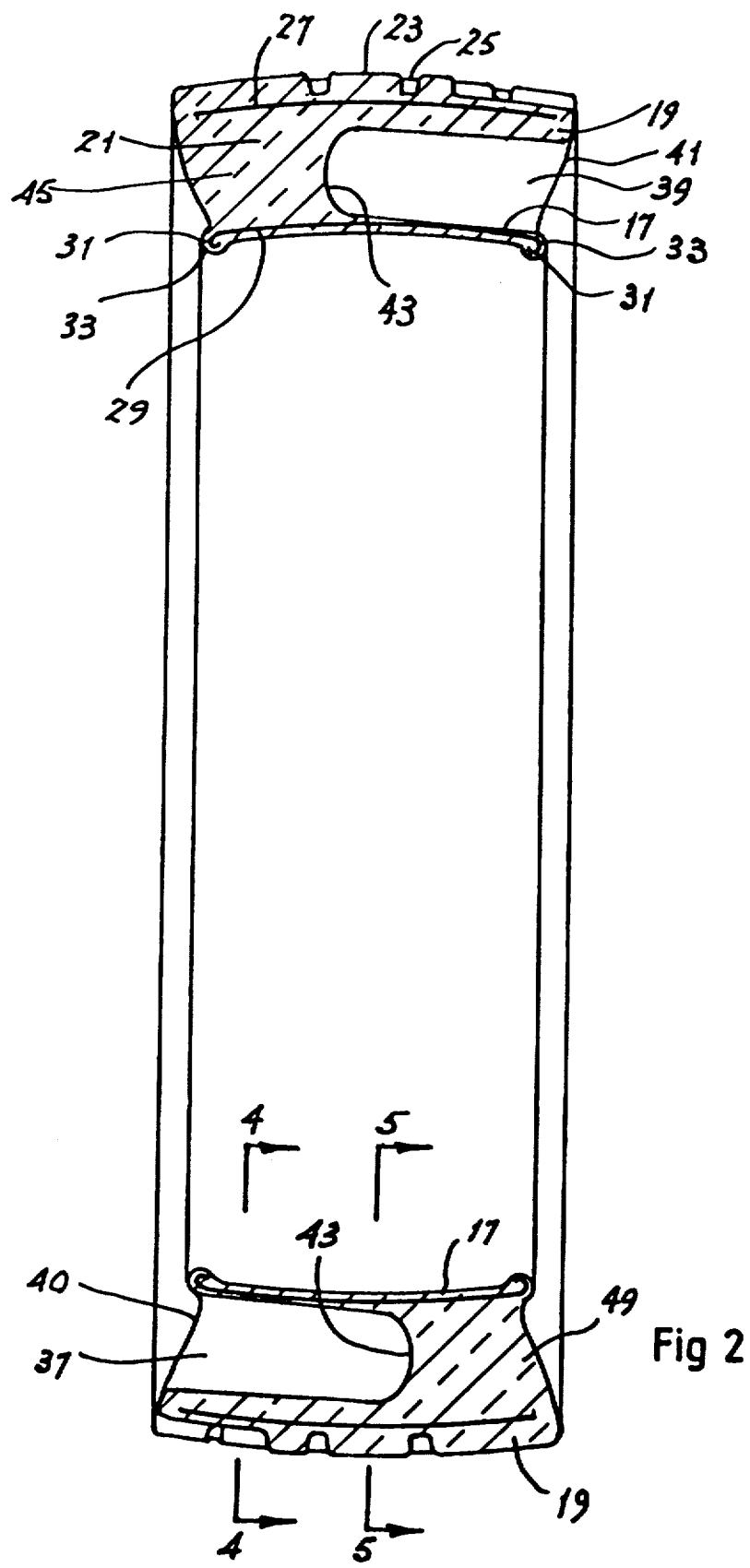
FIG. 2 is a cross-sectional view of the tire according to the embodiment.
Figure 3:
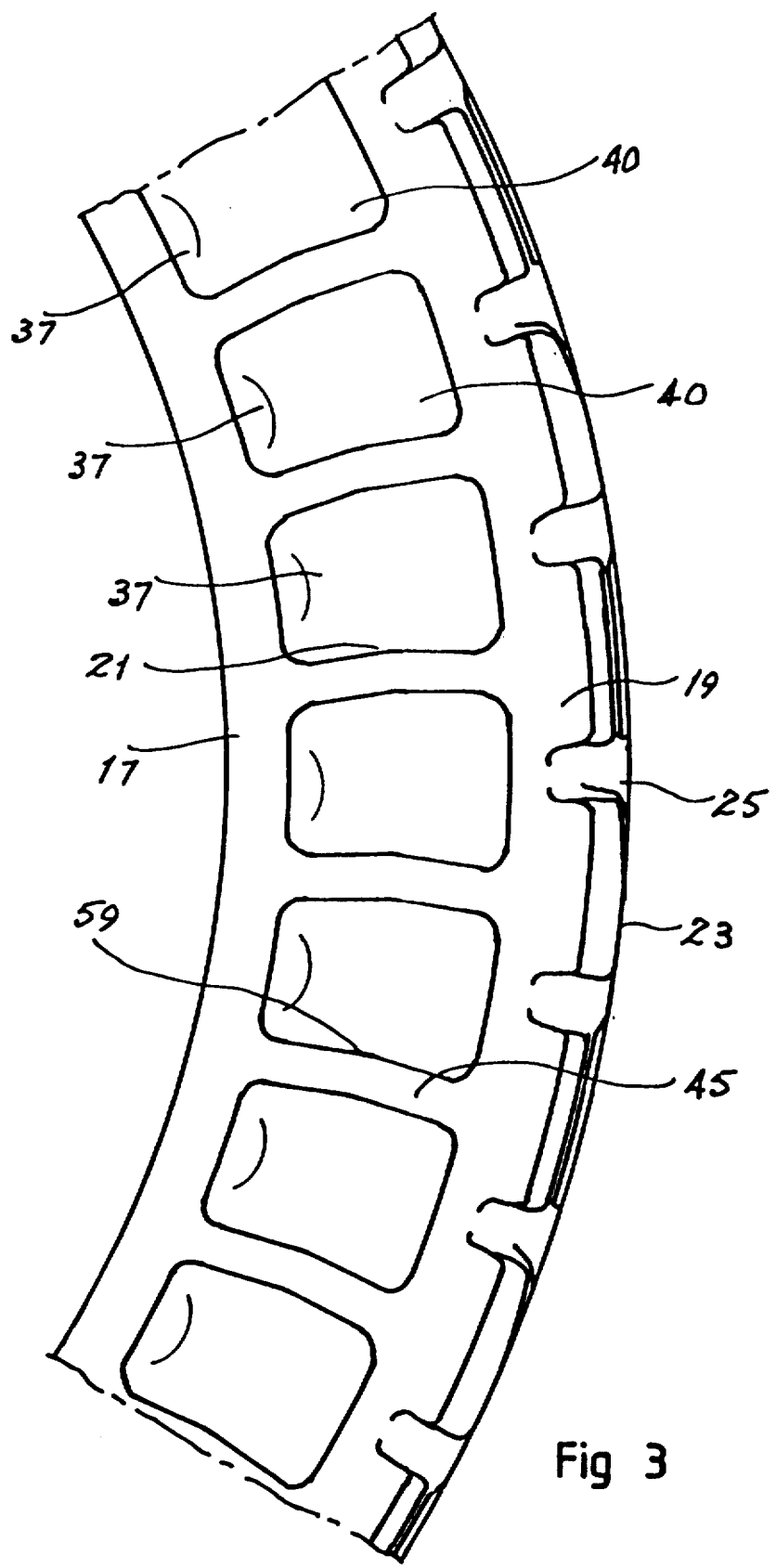
FIG. 3 is a fragmentary side view of the tire, on an enlarged scale.
Figure 4:
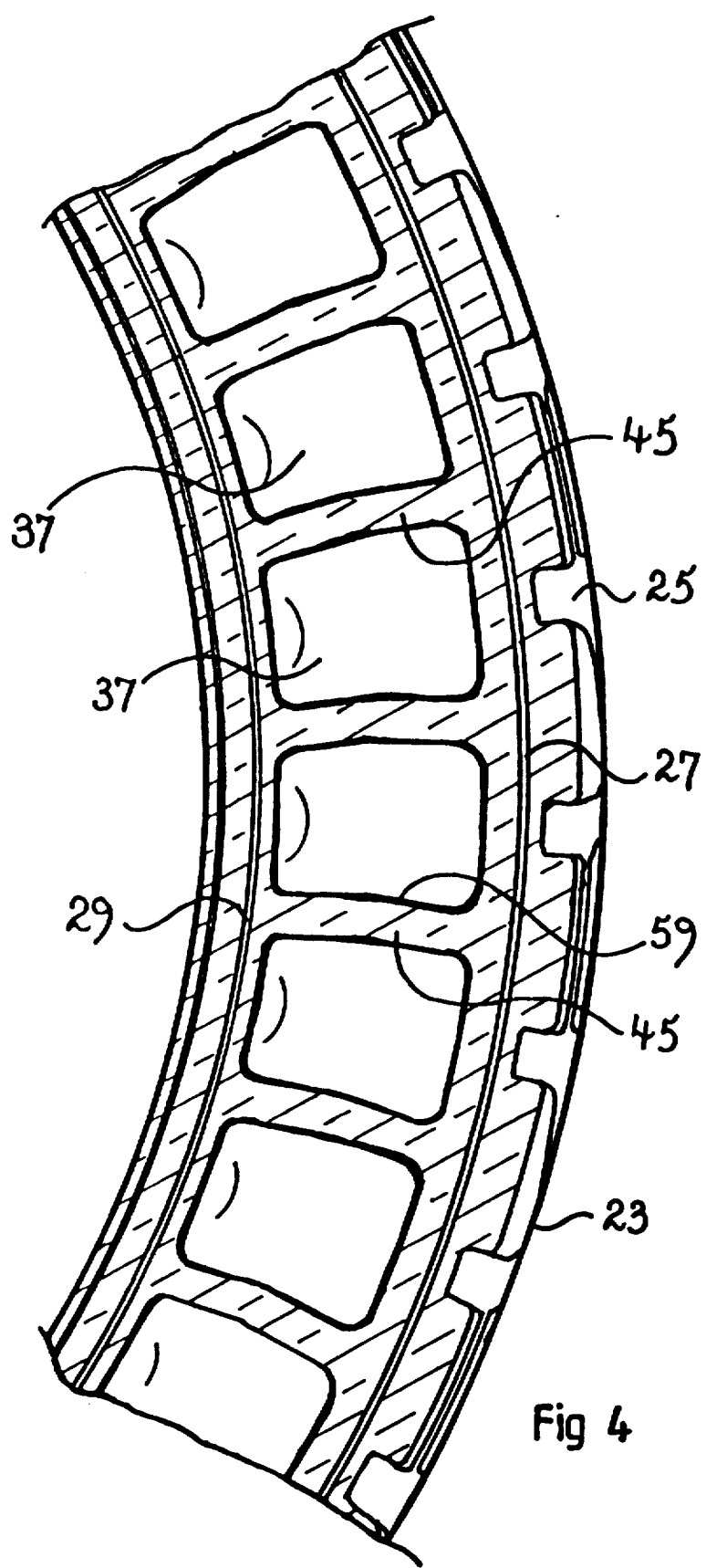
FIG. 4 is a section along the line 4—4 of FIG. 2, on an enlarged scale.
Figure 5:
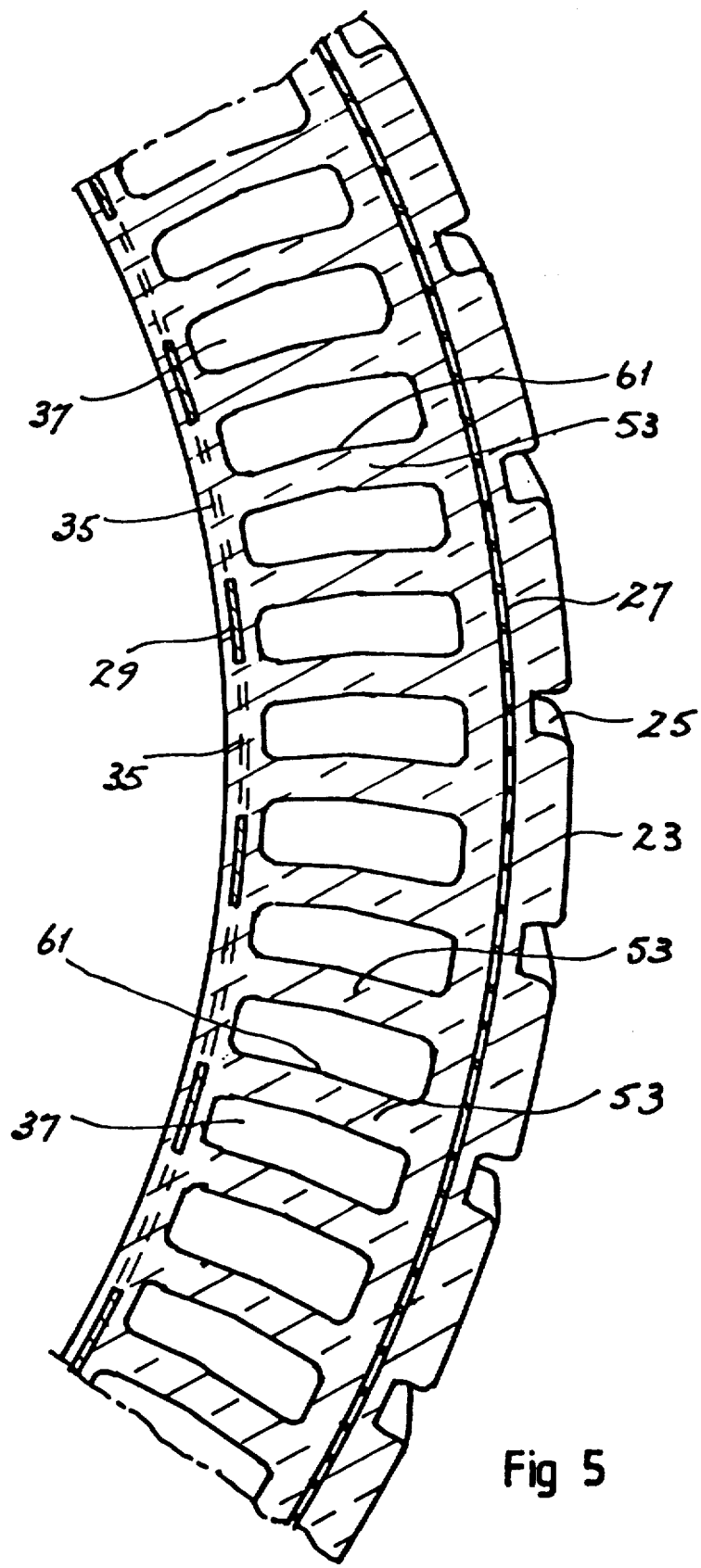
FIG. 5 is a section along the line 5—5 of FIG. 2, on an enlarged scale.
Figure 6:
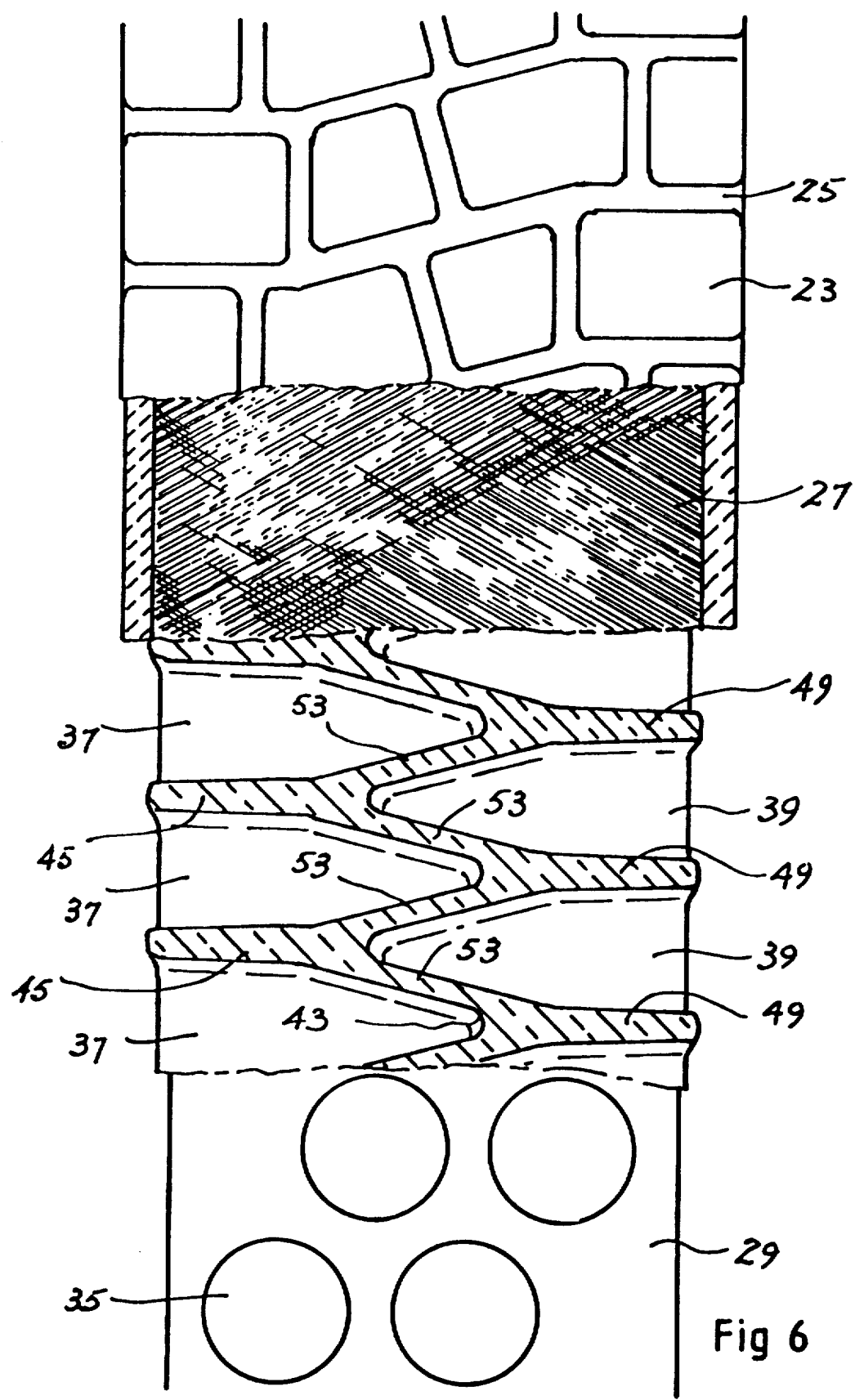
FIG. 6 is an elevational view of the tire with various parts cut away to reveal the internal construction of the tire.

The tire 10 comprises an annular body 15 of composite construction having a radially inner portion 17, a radially outer portion 19 and an intermediate portion 21 between the inner and outer portions. The radially inner portion 17 is adapted to be mounted on the support rim 11, as best shown in FIG. 7 of the drawings. The radially outer portion 19 defines a running surface 23 having a tread formation 25 for gripping engagement with the ground. The outer portion 19 is also provided with a zone which is reinforced with breaker elements 27 of known type. The radially inner portion 17 of the body is provided with reinforcing means 29 in the form of an annular band which is concentric with the tire and which extends a substantial part across the width of the radially inner portion. The annular band 29 is constructed of metal and in turned back on itself at its sides in an arcuate fashion to provide circumferential ribs 31 which serve to reinforce circumferential beads 33 provided at the sides of the radially inner portion 17 of the tire. The beads 33 are adapted for engagement with the support rim 11, as best seen in FIG. 7 of the drawings. The annular band 29 is provided with a plurality of holes 35, as shown in FIG. 6 to facilitate bonding of the elastomeric material to the band. The band 29 serves to reinforce the radially inner portion 17 of the tire so that it can be securely fixed to the rim.

The body 15 of the tire is of composite construction, being formed predominantly of an elastomeric material (such as rubber) which is firm yet resiliently flexible and having the breaker elements 27 and the reinforcing means 29 encased therein.

The intermediate portion 21 of the tire is provided with two sets of passageways 37 and 39, one corresponding to each side of the tire. The passageways in each set open onto their corresponding sides of the tire at respective openings 40 and 41 and extend across the tire towards the other side, terminating at 43 inwardly of said other side.

The set of passageways 37 are circumferentially spaced apart around the tire whereby a partition 45 is defined between neighbouring passageways. Similarly, the passageways 39 are circumferentially spaced apart around the tire whereby a partition 49 is defined between neighbouring passageways. The partitions 45 and 49 define rib members which extend between the radially inner and outer portions 17 and 19.

The two sets of passageways are circumferentially offset in relation to each other such that each passageway in one set extends into the region between neighbouring passageways in the other set and vice versa, as best seen in FIG. 6 of the drawings. The inner portions of the passageways converge in the inward direction to 43, also as best seen in FIG. 6. With such a construction, there is defined a further partition 53 between each passageway in one set and a neighbouring passageway in the other set. The partitions 53 constitute web sections which co-operate to define a web which extends circumferentially around the tire and which extends between the radially inner and outer portions of the tire. In this embodiment, the web sections define a web which is of zig-zag formation. Also with this arrangement, the ribs defined by partitions 45 and 49 are integrally connected to the web defined by partitions 53 at the ends of the partitions 53.

Because of the resiliently flexible nature of the elastomeric material from which the body is predominantly constructed, the ribs and web sections are capable of flexing and this feature assists in providing cushioning to the tire. The zig-zag formation of the web sections 53 enhances the stability of the tire and resists uncontrolled collapse of the web defined by such web sections. To enhance the flexing action, the ribs defined by partitions 45 and 49 between neighbouring passageways in each set are configured so as to be somewhat angular in profile to define a zone 59 at which the ribs can resiliently flex. Similarly, the web sections defined by partitions 53 are configured so as to be somewhat angular in profile to define a zone 61 at which the web sections can resiliently flex. The ribs and web sections thus have upper and lower portions that meet at a point of angularity to define the flex zones 59 and 61. As can be seen in the drawings, the upper and lower rib portions and web sections have generally parallel side faces extending transversely to a rotational direction of the tire in the region of angular disposition of each rib.

From the foregoing, it is evident that the present invention provides a tire which is non-pneumatic but which is capable of flexing to provide a cushioned ride.

It should be appreciated that the scope of the invention is not limited to the scope of the embodiment described. For instance, rather than being of unitary construction, the body may be constructed as a plurality of segments which can be positioned around and affixed to the support rim. With this arrangement, segments can be replaced on an individual basis in the event of damage.

In summary the invention provides a non-pneumatic tire comprising an annular body of resilient construction having a radially outer peripheral portion, a radially inner peripheral portion, a radially compressible circumferential web extending between and connected to the radially inner and outer portions, and an intermediate portion between the radially outer and radially inner peripheral portions, said intermediate portion being provided on either side of the circumferential web with an arrangement of radially compressible ribs, said arrangements having evenly matched numbers of ribs disposed in a complementary manner, each rib extending between and being connected to the radially inner and outer peripheral portions and to the circumferential web wherein the circumferential web comprises consecutive web sections extending in alternate directions, and each rib comprises a radially inner and a radially outer rib portion formed integrally and disposed angularly with respect to each other to define a zone about which the ribs can flex thereby to provide a cushioned, durable tire.

Furthermore the invention provides a non-pneumatic tire comprising an annular body of resilient construction having a radially outer peripheral portion, a radially inner peripheral portion for mounting on a rim, and an intermediate portion between the radially outer and radially inner portions, said radially inner portion having a circumferential bead provided on each side thereof for engagement with the rim, a reinforcing means encased in said radially inner portion, said reinforcing means having sides configured to provide reinforcement for said circumferential beads, said intermediate portion being provided on either side of the circumferential web with an arrangement of passages, said arrangements having evenly matched numbers of passages disposed in a complementary manner, the passages of each side of the circumfereial web open out into the corresponding sidewall of the tire and extend inwardly across the tire and terminate at the intermediate portion of the circumferential web, said passages are offset in relation to each other such that each passage extends into the region between the neighboring corresponding passages, and wherein a rib is defined by a further portion of the annular body between each passage and between each neighboring corresponding passage wherein consecutive web sections extend in alternate directions, each rib comprises an inner and an outer portion formed integrally and disposed angularly with respect to each other to define a region about which the ribs can flex, and each web section comprises an inner and an outer portion, formed integrally and disposed angularly with respect to each to define a zone about which web section can flex.

I claim:

1. A non-pneumatic tire comprising an annular body of resilient construction having a radially outer peripheral portion, a radially inner peripheral portion and an intermediate portion between the radially outer and the radially inner portions, said intermediate portion being provided on either side of the circumferential web with an arrangement of circumferentially spaced apart passages, said arrangements having evenly matched numbers of passages disposed in a complementary manner, the passages on one side of the circumferential web corresponding to the passages on the other side of the circumferential web, whereby the passages open out into the corresponding sidewalls of the tire and extend inwardly across the tire and terminate at the intermediate portion of the circumferential web, said complementary passages being offset in relation to each other such that each passage on one side of the circumferential web extends into the region between the neighboring passage on the other side of the circumferential web, wherein a rib is defined by each portion of the annular body between neighboring passages on either side of the circumferential web, wherein consecutive web sections extend in alternate directions, each rib comprises an inner and an outer rib portion formed integrally and disposed angularly with respect to each other to define a region about which the ribs can flex, and each web section comprises an inner and an outer rib portion formed integrally and disposed angularly with respect to each other to define a zone about which the web section can flex.

2. A non-pneumatic tire comprising an annular body of resilient construction having a radially outer peripheral portion, a radially inner peripheral portion for mounting on a rim, and an intermediate portion between the radially outer and radially inner portions, said radially inner portion having a circumferential bead provided on each side thereof for engagement with the rim, a reinforcing means encased in said radially inner portion, said reinforcing means having sides configured to provide reinforcement for said circumferential beads, said intermediate portion being provided on either side of the circumferential web with an arrangement of passages, said arrangements having evenly matched numbers of passages disposed in a complementary manner, the passages of each side of the circumfereial web open out into the corresponding sidewall of the tire and extend inwardly across the tire and terminate at the intermediate portion of the circumferential web, said passages are offset in relation to each other such that each passage extends into the region between the neighboring corresponding passages, and wherein a rib is defined by the portion of the annular body between the neighboring corresponding passages, and a web section is defined by a further portion of the annular body between each passage and between each neighboring corresponding passage wherein consecutive web sections extend in alternate directions, each rib comprises an inner and an outer portion formed integrally and disposed angularly with respect to each other to define a region about which the ribs can flex, and each web section comprises an inner and an outer portion, formed integrally and disposed angularly with respect to each to define a zone about which the web section can flex.

3. A non-pneumatic tire comprising an annular body of resilient construction having a radially outer peripheral portion, a radially inner peripheral portion, a radially compressible circumferential web extending between and connected to the radially inner and outer portions, and an intermediate portion between the radially outer and radially inner peripheral portions, said intermediate portion being provided on either side of the circumferential web with an arrangement of radially compressible ribs, said arrangements having evenly matched numbers of ribs disposed in a complementary manner, each rib extending between and being connected to the radially inner and outer peripheral portions and to the circumferential web wherein the circumferential web comprises consecutive web sections extending in alternate directions, said web sections comprising inner and outer web portions formed integrally and disposed angularly with respect to each other to define a zone about which the web can flex and wherein each rib comprises a radially inner and a radially outer rib portion formed integrally and disposed angularly with respect to each other to define a zone about which the ribs can flex thereby to provide a cushioned, durable tire.

4. A tire according to claim 3 wherein the inner and outer web sections have generally parallel side faces extending transversely to a rotational direction of the tire in the region of angular disposition of each rib.

* * * * *